United States Patent
Moravec et al.

(10) Patent No.: US 7,144,598 B2
(45) Date of Patent: Dec. 5, 2006

(54) RAPID, THERMALLY CURED, BACK SIDE MAR RESISTANT AND ANTIREFLECTIVE COATING FOR OPHTHALMIC LENSES

(75) Inventors: Thomas J. Moravec, Maple Grove, MN (US); Martin L. Hage, Maple Grove, MN (US); Michael S. Boulineau, Forest Lake, MN (US)

(73) Assignee: Vision-Ease Lens, Ramsey, MN (US)

( * ) Notice: Subject to any disclaimer, the term of this patent is extended or adjusted under 35 U.S.C. 154(b) by 0 days.

(21) Appl. No.: 10/739,630

(22) Filed: Dec. 17, 2003

(65) Prior Publication Data

US 2004/0156983 A1 Aug. 12, 2004

Related U.S. Application Data

(60) Provisional application No. 60/434,347, filed on Dec. 17, 2002.

(51) Int. Cl.
*B05D 5/06* (2006.01)
(52) U.S. Cl. ............... 427/164; 427/493; 427/512; 427/515; 427/240; 427/425; 427/372.2; 427/379; 427/380; 427/385.5; 427/386; 427/387; 427/393.5; 351/166; 351/177; 359/581
(58) Field of Classification Search .......... 427/493, 427/508, 512, 515, 162, 164, 240, 425, 372.2, 427/379, 380, 385.5, 386, 387, 393.5, 412.1, 427/419.5; 351/166, 177; 359/581
See application file for complete search history.

(56) References Cited

U.S. PATENT DOCUMENTS

| | | | |
|---|---|---|---|
| 4,348,462 A | 9/1982 | Chung | |
| 5,127,362 A * | 7/1992 | Iwatsu et al. | 118/667 |
| 5,219,654 A | 6/1993 | Singh et al. | |
| 5,316,791 A | 5/1994 | Farber et al. | |
| 5,395,697 A * | 3/1995 | Morrison | 428/412 |
| 5,619,288 A | 4/1997 | White, Jr. et al. | |
| 5,728,758 A | 3/1998 | Smith | |
| 5,800,926 A * | 9/1998 | Nogami et al. | 428/447 |
| 5,997,943 A * | 12/1999 | Azzopardi et al. | 427/167 |
| 6,001,163 A | 12/1999 | Havey et al. | |
| 6,200,684 B1 * | 3/2001 | Yamaguchi et al. | 428/447 |
| 6,372,354 B1 | 4/2002 | Park et al. | |
| 6,420,451 B1 | 7/2002 | Lin et al. | |
| 6,514,574 B1 * | 2/2003 | Valeri et al. | 427/515 |
| 2002/0041929 A1 | 4/2002 | Magne | |

FOREIGN PATENT DOCUMENTS

JP 2002-122704 A * 4/2002

* cited by examiner

*Primary Examiner*—Alain L. Bashore
(74) *Attorney, Agent, or Firm*—Inskeep IP Group, Inc.

(57) ABSTRACT

Disclosed is a process to rapidly spin-apply an AR coating system to a backside of a prescription lens. The AR coating system comprises a polyurethane primer layer, a siloxane thermally cured scratch resistant coating layer, a two-layer sol-gel AR coating, and a hydrophobic layer. The process comprising steps of spin-applying each of the layers provides a quick way to furnish a prescription lens that is AR coated on both sides.

16 Claims, No Drawings

RAPID, THERMALLY CURED, BACK SIDE MAR RESISTANT AND ANTIREFLECTIVE COATING FOR OPHTHALMIC LENSES

CROSS REFERENCE TO RELATED APPLICATIONS

The present application claims priority to U.S. Provisional Patent Application Ser. No. 60/434,347, filed Dec. 17, 2002, whose contents are fully incorporated herein by reference.

BACKGROUND OF THE INVENTION

1. Field of the Invention

This invention is generally related to a process allowing an integrated retailer of ophthalmic lenses to furnish a prescription lens with an antireflective (AR) coating on both sides. This invention is particularly related to a process to furnish such an AR coated lens in a short period of time, by applying a thermally curable hard coating and AR coating in a single spin coater.

2. Description of the Related Art

Plastic ophthalmic lenses made from materials, such as polycarbonate and Allyl Diglycol Carbonate (CR-39®, became popular due to their low cost and light weight over glass lenses. Polycarbonate lenses have superior impact resistance compared to CR-39® lenses, and are preferred for applications that require additional safety features. The use of polycarbonate lenses, particularly in the United States, is widespread.

Like glass lenses, plastic lenses suffer from reflective light losses at the air/lens interface. The loss is about seven percent of the transmitted light. The reflective loss is even more severe for lenses made from polycarbonate due to its high refractive index. An effective way to increase the light transmission is to apply an AR coating on the surfaces. AR coatings reduce the reflectance of light from a surface thereby increasing the light transmittance through the coating/substrate interface.

An AR coating, when applied to both sides of a lens, not only increase the light transmission but also improves the cosmetic appearance of the glasses by reducing both internal and external reflections. Night vision is also improved by reducing glare and halos from light sources such as headlights. The reduction of glare further reduces eyestrain when looking at a computer screen or working under fluorescent light for an extend time.

The demand for AR coated ophthalmic lenses has increased and keeps growing due to the aforementioned advantages. Current AR coatings are primarily applied by vacuum deposition techniques such as sputtering or evaporation. Because these methods require lengthy work time, expense, and highly technical equipment, their operations are limited to lens manufacturers, large lens processing labs, or special optical coating facilities. While this practice satisfies the need of AR-coated finished ophthalmic lenses, it fails the market demand for rapid delivery of AR-coated prescription lenses made from semi-finished lens blanks.

In addition to vacuum deposition techniques, AR coatings can also be formed by sol-gel techniques. In a typical sol-gel process, AR coating precursors are made into colloidal solutions and then applied to the substrate through methods such as dip-coating or spin-coating. The coated layer is then thermally cured to a continuous film to provide AR function. An AR coating may contain a single layer or multiple layers. AR coatings from sol-gel techniques are describe in U.S. Pat. Nos. 4,966,812, 5,268,196, 5,476,717, 5,580,819, 5,858,526, and 6,372,354, all of which are herein incorporated by reference. In particular, U.S. Pat. No. 6,372,354 discloses a sol-gel composition and process to form an AR coating on plastic substrates with a curing time of thirty minutes or less.

Sol-gel techniques provide a rapid process to apply AR coatings. The process requires considerably less time, cost, and expertise than vacuum deposition methods. Thus, it enables an integrated retailer of ophthalmic lenses or a small scale optical lab to make a pair of AR coated, prescription lenses from semi-finished lens blanks in a short period of time (e.g., one hour or less).

However, poor adhesion may exist between an AR coating and the lens surface. Consequently, lenses (especially polycarbonate lenses) need an adhesion promoting layer between the AR coating and the lens surface. Hard-coating layers may be the promoting layer. In general thermally curable coating requires long curing time such as several hours. The inventors have found thermally curable hard coating (also known as a Tegra® coating by Vision-Ease) provide good adhesion and also can be cured within a short time by using the process described in the commonly assigned co-pending U.S. Application Ser. No. 10/632,627 filed Jul. 31, 2003 entitled Spin Application of Thermally Cured Hardcoats, the entire contents of which is hereby incorporated by reference.

BRIEF SUMMARY OF THE INVENTION

It is thus an object of the present invention to provide a process and materials to quickly make ophthalmic lenses coated with an AR coating on both sides, from semi-finished lenses. Thus, an integrated retailer of ophthalmic lenses or a small optical lab can furnish its customers with a pair of AR coated, prescription lenses in a short period of time (e.g., one hour or less).

The object is achieved by first providing the retailer a series of ophthalmic semi-finished lens blanks with a factory applied, vacuum deposited AR coating on the front side. The retailer makes the prescription from the front side AR-coated semi-finished lens blanks, then rapidly applies the backside AR coating according to the process of the present invention.

The process of the present invention comprises steps of:
a) spin-applying a thermally curable, backside hard coating;
b) spin-applying a thermally curable, backside AR coating.

The hard coating maybe composed of the siloxane or sol-gel type. Its detailed composition and application process is described in the above-referenced co-pending U.S. application Ser. No. 10/632,627 (incorporated by reference). The AR coating maybe of sol-gel type. Both the hard coating and the AR coating are applied on the lens back in the same unit by a spin-coating technique. Each of the steps takes a short period of time (e.g., thirty minutes or less).

The backside AR coating applied according to the present invention has improved adhesion to the lens surface, and passes all standard tests.

DETAILED DESCRIPTION OF THE INVENTION

The inventive process for spin-applying thermal curable hard coating and AR coating is applicable to the back surfaces of surfaced semi-finished lenses made from any lens material. Preferred lens materials include (meth)acrylic resins, polycarbonate resins, di(ethyleneglycol) bis(allyl carbonate) copolymers, (halogenated) bisphenol A di(meth)acrylate homopolymers and copolymers, (halogenated) bisphenol A urethane modified di(meth)acrylate homopolymers and copolymers, polyurethanes, polyesters, cellulose acetate butyrate, and acrylonitrile butadlene styrene terpolymar. More preferred lens materials are di(ethyleneglycol) bis(allyl carbonate) copolymers such as CR-39® from PPG Industries, polycarbonates such as Lexan® from General Electric and Makrolon® from Bayer, and high refractive index resins such as MR-6®, MR-7® and MR-8® plastics from Mitsui Toatsu.

The total structure of the backside AR coating applied according the present invention comprises preferably a primer layer, a hard coating layer, and an AR-coating (single- or multi-layer). The primary layer and the hard coating layer enhance the adhesion of the AR coating and also act as buffer layers to prevent cracks due to thermal shock. On top of the AR-coating, there may optionally be applied an abrasion resistant coating or a hydrophobic coating. The hydrophobic character may also be inherent from the low refractive index outer layer of the AR-coating.

After a semi-finished, front side AR-coated lens blank is made to a prescription, a hard coating is first applied on the backside of the lens. Detailed process and coating materials are described in above-mentioned co-pending U.S. application Ser. No. 10/632,627, incorporated herein by reference in its entirety. The primary function of the hard coating layer is to promote the adhesion of the AR coating to the lens. Because sol-gel AR coatings are based on metal oxides, the best adhesion promotion is provided by siloxane or sol-gel types of hard coatings. The hard coating layer also improves the abrasion resistance and the thermal shock resistance of the AR coating, especially when the lens material is softer, such as polycarbonate. Example commercial coatings are the CrystalCoat siloxane coatings such as MP-2105 from SDC Coatings (Anaheim, Calif.).

The process to apply a thermally cured hard coating is briefly described as:
  (a) Preparing a siloxane coating composition comprising: an aqueous-organic solvent mixture containing the various hydrolysis products and partial condensates of an epoxy functional silane, a tetraalkoxysilane, and a multifunctional compound wherein the multifunctional compound is selected from the group consisting of multifunctional carboxylic acids, multifunctional anhydrides, and combinations thereof, and wherein the epoxy functional siloxane monomer is present in a molar ratio to the tetrafunctional silane of from about 0.1:1 to about 5:1; and an amount of water sufficient to hydrolyze the epoxy functional silane and the tetraalkoxysilane;
  (b) Spin-applying the coating to the backside surface of the prescription lens with the composition resulting from step (a), at predetermined spin speeds and predetermined spin times to provide a desired final cured coating thickness;
  (c) Precuring the coating to a tack free state at a predetermined temperature and for a predetermined time;
  (d) Transferring the precured lens into an oven to completely cure the coating at a predetermined temperature and for a predetermined time.

Any spin coater equipped with a coating spray cycle and a thermal curing cycle for precuring can be used in the process of this invention. Spin coaters designed for applying radiation curable coatings can be easily converted for use in the process of this invention, by replacing the radiation curing components with thermal curing components. In some cases, the spin coater for radiation curable coatings already has an infrared heating element in a chamber for thermally accelerating the evaporation of the solvent, drying the lens, and is suitable for effecting the precure of a thermally cured coating. In some other cases, there is enough radiant heat from the radiation curing equipment that a thermal precure can suitably be effected.

A preferred spin coater should have at least the following processes: washing, drying, coating, and precuring. Several commercial spin coating machines can be used to wash, dry, apply, and precure a thermally cured coating. These machines include an ASC-500 from Calmation (Simi Valley, Calif.) and a Super Lens Coater from Lightwave Energy Systems (Torrance, Calif.).

For a given coating, the spin speed and time for both the application as well as the spin off are predetermined by experimentation to achieve a desired wet film thickness. It is preferred to apply the coating solution at a spin speed between about 250 rpm to about 2,000 rpm, more preferably between about 500 rpm and about 1,000 rpm. The coating solution is applied for about 0.1 to 10.0 seconds, preferably for about 0.1 to 5.0 seconds, and most preferably for about 0.1 to 1.0 seconds. The spin off speed is usually about the same or higher than the application spin speed, and the spin off time is typically about one to ten seconds.

The flow rate for the coating composition is preferably between about 1 and about 100 milliliters per second, more preferably between 2.5 and 25 milliliters per second.

The desired dry film thickness of the coating is typically between 1.0 and 10.0 microns, more preferably between 3.0 and 6.0 microns.

The precure of the hard coating is accomplished using some combination of radiant and convective energy after the application of the hard coating composition. The precure may be done in the same equipment that was used to apply the coating or the precure may be done in a separate unit. It is desired to have an infrared heat source between 500° F. and 1500° F., preferably about 1,000° F. depending upon the distance of the source from the lens, the cycle time, the coating formula, and the lens material. It is preferred to have convecting hot air in conjugation with the infrared heat. The hot air temperature is preferably between about 150° F. to 600° F., preferably 250° F. to 500° F. Temperatures higher than what the lens material can be heated to may be used due to the short exposure time needed for precure. The present process allows for the use of relatively short thermal precuring times of usually less than thirty seconds, often less than fifteen seconds, and sometimes less than ten seconds.

The precure may also be affected with ultraviolet radiation or a combination of ultraviolet radiation and heat in some cases where a small amount of photoinitiator is used in the siloxane hard coating composition. The photoinitiator may be of the free radical or cationic types.

The final cure of the hard coating is completed by thermal curing at temperatures in the range of 200° F. to 300° F. for a period from about five minutes to about twelve hours. In order to further reduce the time needed to complete a hard coating so that a retailer may finish an AR coated prescription lens from a semi-finished lens in a short time period of typically less than one hour, it is preferred to do the final curing in a vapor curing oven.

In a typical vapor curing oven, a perfluorinated saturated aliphatic hydrocarbon liquid is heated to boiling. The fluid is selected so that its boiling temperature is the desired curing temperature, which for polycarbonate lenses is preferably lower than the glass transition temperature (approximately 135° C.). A suitable fluid to cure the siloxane hard coating used in the present invention is the OC-8100 Fluid produced by 3M. The fluid has a boiling temperature of 130° C. Any vapor degreaser oven may be used as the vapor curing oven. An example is 3M Model OCS 9100. Vapor curing ovens and fluids are available from Ultra Optics (Minnesota) and Groupe Couget Optical (Paris, France).

It is known in the practice that coatings cured with the vapor curing method typically have poor adhesion if the cure time is very short, especially when the lens material is polycarbonate. The use of a polyurethane primer layer between the lens surface and the hard coating provides excellent adhesion for the hard coating to the lens even if the hard coating is cured for only ten minutes or less in a vapor curing oven, instead of a few hours in a convection oven at an elevated temperature (e.g., 250° F.). It is also found, as will be described later, that when a subsequent AR coating is applied to the vapor cured hard coating, and the AR coating is cured in the same vapor curing oven for fifteen minutes or less, excellent adhesion of the AR-hard coating system is still maintained.

The polyurethane primer coating is preferred to be an aqueous polyurethane dispersion as disclosed in U.S. Pat. Nos. 4,364,885, 5,316,791 and 5,972,158, which are incorporated by reference herein. Other types of polyurethane primer, such as acrylic urethane and epoxy urethane, whether waterborne or solventborne may also be used.

The primer layer can be applied in the same way as the coating composition. The dry film thickness of the primer should be controlled in the range from about 0.1 microns to about 1.0 micron, preferably from about 0.1 to about 0.5 microns, most preferably from 0.1 to 0.25 microns.

The simplest form of an AR coating has a single-layered structure, in which a low index material such as porous silicon dioxide is applied on a substrate that has higher reflective index. To minimize the light reflection, the thickness of the low index layer satisfy the so-called quarter wave optical path:

$$n_1 d_1 = \lambda/4$$

where $n_1$ is the refractive index of the low index layer, $d_1$ is the physical thickness of the low index layer, $\lambda$ is the wavelength at which the minimum reflectivity occurs.

In addition to satisfy the quarter wave optical path thickness, the following condition also needs to be satisfied in order to have zero reflectivity:

$$n_1 \sqrt{n_0 n_2}$$

where $n_0$ is the refractive index of air, and $n_2$ is the refractive index of the substrate.

Thus, if the substrate is a lens from polycarbonate whose refractive index is 1.586, a low index coating with a refractive index of 1.259 is ideal for an AR film. A hard coating with a refractive index of about 1.6 should provide better adhesion for the low index AR coating.

A preferred low index material is nano-sized particles of amorphous silica from a sol. The low refractive index is achieved by the introduction of non-scattering porosity. This technique is well know in the field (B. E. Yoldas, "Investigation of porous oxides as an antireflective coating for glass surfaces", *Appl. Opt.*, 19, 1425 (1980)). Such a silica layer is formed by the sol-gel method, in which an silica precursor such as tetramethoxysilane, tetraethoxysilane, and tetrabutoxysilane is hydrolyzed and polycondensed using a catalyst to prepare a silica sol. A suitable silica sol coating solution is prepared by diluting the sol with alcoholic solvents to the silica concentration 0.5% to 5.0% by weight. Suitable alcohols include methanol, ethanol, 1-propanol, 2-propanol, 1-butanol, 2-butanol, and ethylene glycol. As the catalyst, for example, there can be used hydrochloric acid, sulfuric acid, nitric acid, acetic acid, hydrofluoric acid, phosphoric acid, oxalic acid, orthophthalic acid, maleic acid, and itaconic acid.

The silica layer is spin-applied on the surface in the process of this invention. The same spin-coating unit used to apply the hard coating can be used to apply a silica sol solution. The spin parameters such as spin rate and time are controlled to yield a dry film thickness that closes to the quarter wavelength optical path for the desired wavelength light. Typical thickness of the low index silica layer is from about 50 nm to about 150 nm.

The curing of the silica sol may be affected by heat (50° C. to 100° C.) in a convention oven for thirty to sixty minutes. The silica film having a refractive index in the range of 1.25 to 1.45 can be obtained.

The inventors of the present invention have found that, by a method that is similar to the method for curing the siloxane hard coating used in this invention, the silica sol coating can be rapidly cured in a vapor oven in less than ten minutes using the same fluid, and the adhesion of the silica to the siloxane hard coating is satisfactory.

Although it is possible to have a porous silica coating with a refractive index of 1.26 for the best anti-reflective effect on a lens substrate such as polycarbonate, the silica layer usually does not have adequate packing density, which is needed for adhesion, strength, and abrasion resistance. A silica layer with a higher refractive index (e.g., about 1.4) is desired. In order to keep the same anti-reflective effect, another layer having an even higher refractive index (e.g., about 2.0) is needed. The result is a two-layer AR coating system. A two-layer AR coating usually gives a reflective spectrum of "V" shape with minimum reflection at the wavelength corresponding to the quarter wavelength thickness of the low index layer. It is known in the art that by using a stack of two-layer system and by controlling the thickness of each layers, one is able to obtain a desired reflectance spectrum of a "V", "W", or "U" shape, and the desired reflected color.

Suitable metal oxides for the high index layer include titanium oxide, zirconium oxide, indium tin oxide, indium oxide, tin oxide, and antimony tin oxide. Like the silica low index layer, the high index layer can also be obtained with a sol-gel technique using corresponding metal alkoxide precursors. For example, U.S. Pat. No. 5,856,018, herein incorporated by reference, describes a titanium dioxide layer deposited from the sol of a titanium alkoxide (isopropoxide, propoxide, or ethoxide) in ethyl alcohol and water. Other techniques may also be used. For example, U.S. Pat. No. 5,858,526, herein incorporated by reference, discloses an aqueous solution of polyvinyl pyrrolidinone coated zirconium oxide powder to coat a high index layer. U.S. Pat. No. 6,372,354, herein incorporated by reference, describes an indium tin oxide high index layer obtained from a colloidal solution made from fine indium tin oxide powder (particle size <120 nm to 145 nm). If a conductive metal oxide (e.g., indium tin oxide) is used as the high index layer material, the AR coating also possesses an anti-static property.

The spin application of the high index layer is conducted in the same way as the low refractive index layer, and can be done in the same spin coating unit, such as those described in co-pending U.S. application Ser. No. 10/632, 627 (incorporated by reference).

When a multi-layer AR coating system is applied, each layer can be individually cured before the next layer is applied. Curing is effected by a method that is similar to the method that is used to cure the aforementioned silica layer.

In some systems, it is preferred to not fully cure each individual layer before the next layer is applied. Instead, a simple solvent flash-off or partial cure is desired. In the example where the first layer (high index layer) is titanium oxide and the second layer (low index layer) is silica, inter-penetration at the interface of the two layers occurs if the first layer is not fully cured when the second layer is applied. In addition, inter-condensation reaction will take place between the penetrated metal oxide nanoparticles so that the adhesion between the two layers is greatly increased.

Again, the final cure of the AR system may be conducted in a convention oven or a vapor curing oven although the later is preferred for its rapid curing capabilities.

Example commercial sol-gel AR coating systems include the Chemlux AR series from Chemat Technologies (Northridge, Calif.), sol-gel AR coatings from YTCA (Camarillo, Calif.), and Kelar AR coating from Couget Optical (France). Example sol-gel AR coating systems are described in the following U.S. Pat. Nos. 4,966,812, 5,268,196, 5,856,018, and 6,372,354. They are incorporated herein by reference.

Subsequent to the AR coating being applied to the hard coating layer, a hydrophobic layer is applied to protect the AR coating and to render the lens easy to clean. The application of a hydrophobic layer on top of an AR coating is a well known practice in the art. In most cases, the hydrophobic layer is applied through a vacuum deposition process. Typically, the hydrophobic layer generally allows full transmission of light in the normal vision range (especially at a wavelength of 550 nm). The hydrophobic layer may be applied in a layer that is as little as several nanometers in thickness.

Suitable hydrophobic coatings for the process of the present invention are spin applicable coatings derived from low energy organic (per)fluoropolymers and those derived from sol-gel technology. Hydrophobic sol-gel coating from alkoxysilanes and fluoroalkoxysilanes are preferred in view of compatibility with the sol-gel AR coating used in the process. For example, the silane may have a formula of $R_nSiX_{(4-n)}$, wherein R is an alkyl or a fluorinated alkyl group having 1–8 carbons, n is the number of alkyl groups attached to the silicon and X is selected from the group consisting of 1–6 carbon alkoxy, fluorinated alkoxy, hydroxyl, acetoxy, and halogen. The hydrophobic layer is spin-applied preferably with the same spin coating unit.

One complete process to spin-apply a backside AR coating to a prescription lens surfaced from a front side AR coated semi-finished lens, according the present invention is hereby described as following:

(a) Load the lens into a multi-stage spin coater equipped with at least a washing/cleaning cycle, a spray/spin cycle, and an infrared dry/precure cycle. After the lens was cleaned, a waterborne aliphatic polyurethane dispersion was then applied to the backside of the lens as a primer by spraying the solution at room temperature onto the center of the lens for few seconds as the lens was spinning at 500 to 1000 rpm. Immediately after completing the spraying of the primer, the lens was spun at about 2,000 rpm for one second. The lens is dried for few second by exposing the lens to an infrared heating source.

(b) Transfer the lens to the hard coating application stage. Spin-coat the backside at about 200 rpm to about 1000 rpm for few seconds with a thermally curable siloxane type hard coating. The spin rate is determined experimentally to obtain the desired final coating thickness, e.g., four to six micrometers. The coated lens is immediately exposed to a source of IR light for up to about one minute for solvent flash off and precure to tack-free. If a cationic photoinitiator is used in the coating composition, an ultraviolet light source is used with or without an infrared source.

(c) Fully cure the hard coating in a vapor curing oven at about 100° C. to about 150° C. for about five minutes to about twenty minutes.

(d) Spin-apply the first (high index) layer of an AR coating in the same or different spin-coating unit used to apply the hard coating. The spin parameters (e.g., spin rate 500 rpm and spin time thirty seconds) are experimentally determined to give the desired final thickness (e.g., from about 50 nm to 150 nm).

(e) Spin-apply the second (low index silica) layer of an AR coating. The same spin-coating unit used to apply the first layer of AR coating is used to apply the silica sol-gel solution. The spin parameters (e.g., spin rate 500 rpm and spin time thirty seconds) are experimentally determined to give the desired final thickness (e.g., from about 50 nm to 150 nm).

(f) Spin-apply a fluorinated alkoxysilane sol-gel hydrophobic layer in the same spin coating unit used to apply the AR coating. Again the spin rate and time is determined experimentally so that the thickness of hydrophobic layer is thin as desired (few nanometers) that it does not affect the performance of the AR coating.

(g) Fully cure the AR coating and the hydrophobic layer in a vapor curing oven at about 100° C. for five to twenty minutes.

EXAMPLES

Having been generally described, the process of the present invention will now be illustrated in more detail in reference to examples, which are for illustration purpose only and should not in any way be construed as a limitation upon the scope of this invention.

The abrasion resistance is expressed as the Bayer ratio, which shows the relative abrasion resistance of the test specimen as compared to a standard reference lens, which is commonly manufactured and used as a benchmark in the ophthalmic lens industry. Higher Bayer ratios indicate greater degrees of abrasion resistance. The Bayer ratio is determined by making percent haze measurements of a test specimen that is to be measured and an uncoated standard reference lens. The haze measurements of each are made both before and after the lenses are concurrently abraded in an oscillating sand abrader as in ASTM test method F 735-81. Uncoated CR-39® (poly[di(ethylene glycol) bis (allyl carbonate)]) lenses are used as the uncoated standard reference lenses. The abrader is oscillated for 300 cycles with 500 grams of aluminum zirconium oxide, ZF 152412 as supplied by Saint Gobain Industrial Ceramics, New Bond Street, PO Box 15137, Worcester, Mass. 01615-00137. The haze before and after abrading, $H_o$ and $H_p$ is measured using a hazegard plus haze meter from BYK Gardner. The Bayer ratio is expressed as:

$$BayerRatio = \frac{(H_f - H_o)_{Standard}}{(H_f - H_o)_{Lens}}$$

The adhesion of the coating is determined by ASTM test method D 3359-95A, which is widely known and commonly used throughout the coatings industry.

The reflectivity and residual color of an AR coating are measured with a HunterLab UltraScan spectrophotometer.

Example 1

32 aspheric semi-finished single vision polycarbonate lenses with base curves ranging from 0.50 to 8.5 diopter were AR coated on the front side in a conventional, high vacuum AR coating system (Satis 900, Satis Vacuum, Switzerland). These lenses were then surfaced, cribbed to 74 mm in diameter, and processed into ophthalmic prescriptions ranging from −7.5D sphere by −2.75D cylinder to +7.75D by −1.50D cylinder.

The lenses were then spin-coated on the backside with a polyurethane primer and a siloxane hard coating with the process described in the co-pending application Ser. No. 10/632,627 (incorporated by reference) using a LESCO (Torrance, Calif.) Model ATM-20 spin coater. The final cure was effected in a 3M Model OCS9100 vapor curing oven with 3M OC-8100 fluid for 8 minutes, instead of curing in a convention oven for 4 hours.

The lenses were then spin-coated with the Chemalux sol-gel AR coating system, which includes a high index layer, a low index layer, and a hydrophobic layer, from Chemat Technologies (Northridge, Calif.).

Out of the 32 lenses, 26 lenses had acceptable cosmetics and the residual color of the AR coating on the backside matched the front side residual color. All of the lenses passed a standard crosshatch adhesion test. The backside had a Bayer ratio of 2.5.

Comparison Example 1

The procedure in Example 1 was followed except an UV curable acrylate hard coating (LTI 825, Lens Technology, La Mirada, Calif.) was applied on the backside before the AR coating. The backside had a Bayer ratio of only 0.8.

It is thus demonstrated that the process of the present invention, which applies a backside AR coating system comprising a primer layer, a hard coating layer, a two-layer AR coating, and a hydrophobic layer within a short period of time using an affordable spin coating unit, provide adequate adhesion of the coating to the lens as well as high abrasion resistance.

In closing, it is to be understood that the exemplary embodiments disclosed herein are illustrative of the principles of the present invention. Other modifications that may be employed are within the scope of the invention. Thus, by way of example, but not of limitation, alternative configurations may be utilized in accordance with the teachings herein. Accordingly, the description is illustrative and not intended to be a limitation thereof.

What is claimed is:

1. A process for spin applying an AR coating system onto at least one surface of a lens made of polymer within the same spin coating unit, which comprises:
    (a) Providing a semi-finished lens wherein a front surface of said semi-finished lens has a pre-applied AR coating;
    (b) Creating a prescription power in said lens by grinding a back surface of said lens;
    (c) Applying a thermally curable siloxane hard coating composition to said back surface in a spin coating unit;
    (d) Precuring said hard coating to a tack-free state in the same spin coating unit at a set temperature for a set time;
    (d) Applying a high index layer of an AR coating to said back surface at a set spin rate for a set time in said same spin coating unit, and precuring the layer at a set temperature and for a set time;
    (f) Applying a low index layer of an AR coating to said back surface at a set spin rate for a set time in said same spin coating unit, and precuring the layer at a set temperature and for a set time;
    (g) Applying a hydrophobic coating layer to said back surface at a set spin rate for a set time in said same spin coating unit;
    (h) Substantially fully curing the high index AR coating, the low index AR coating and the hydrophobic coating layer in a vapor curing oven.

2. The process of claim 1, wherein a primer layer is applied and cured in the spin-coating unit before the hard coating is applied.

3. The process of claim 1, wherein the precuring in step (b) includes curing for less than about ten minutes at a chamber temperature range from 150° F. to 300° F.

4. The process of claim 1, wherein the high index layer, the low index layer of the AR coating and the hydrophobic coating layer are spin-applied at a temperature ranging from about 80° F. to 100° F.

5. The process of claim 1, wherein the final curing of the high index AR coating, the low index AR coating and the hydrophobic coating layer in step (f) lasts between about five to twenty minutes in a vapor curing oven at a temperature range from about 200° F. to 300° F.

6. The process of claim 1, wherein the thermally curable hard coating comprises an aqueous organic solvent mixture including hydrolysis products and partial condensates of a functional silane, a tetrafunctional silane and a multifunctional compound wherein the multifunctional compound is selected from the group consisting of multifunctional carboxylic acids, multifunctional anhydrides and combinations thereof and an amount of water sufficient to hydrolyze the functional silane and the tetrafunctional silane.

7. The process of claim 6, wherein the functional silane is selected from a group consisting of epoxy functional silanes, amino functional silanes, halo functional silanes, hydroxyl functional silanes, carboxyl functional silanes, and isocyanate functional silanes.

8. The process of claim 7, wherein the functional silane compound containing at least one epoxy group and at least two alkoxy groups directly bonded to the silicon atom of the molecule has formula:

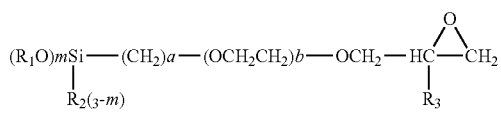

wherein R1 is an alkyl or alkoxy alkyl group having 1 to 4 carbon atoms; R2 is an alkyl or aryl group having 1 to 6 carbons atoms; R3 is hydrogen or methyl group; m is 2 or 3; a is an integer from 1 to 6; and b is 0,1 or 2.

9. The process of claim 7, wherein the functional silane compound contains at least one epoxy group and at least two alkoxy groups directly bonded to the silicon atom of the molecule is selected from the group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxyethoxypropylmethyldimethoxysilane, and mixtures thereof.

10. The process of claim 1, wherein the lens material is selected from a group consisting of (meth)acrylic resins, di(ethyleneglycol) bis(allyl carbonate) (co)polymers, (halogenated) bisphenol A di(meth)acrylate hormopolymers and copolymers, urethane modified (halogenated) bisphenol A, and polycarbonates.

11. The process of claim 2, wherein the primer coating layer is from a waterborne aliphatic polyurethane dispersion.

12. The process of claim 8, wherein the hard coating composition contains 0.05% to 5%, by weight cationic photoinitiator, and the precure of the hard coating is affected with ultraviolet radiation or a combination of ultraviolet light and heat.

13. The process of claim 1, wherein the high index layer of the AR coating is made of metal oxide selected from the group consisting of titanium oxide, zirconium oxide, indium tin oxide, indium oxide, tin oxide, and antimony tin oxide.

14. The process of claim 1, wherein the low index layer of the AR coating is derived from a metal alkoxide, M(OR)n, wherein M is selected from at least one of the group consisting of Si, Ti, Al, and Zr; R is an alkyl group having 1–6 carbons and n is an integer representing the valence state of the metal ion.

15. The process of claim 1, wherein the hydrophobic coating layer is derived from a silane, $R_nSiX_{(4-n)}$, wherein R is an alkyl or a fluorinated alkyl group having 1–8 carbons, n is the number alkyl group attached to the silicon and X is selected from the group consisting of 1–6 carbon alkoxy, fluorinated alkoxy, hydroxyl, acetoxy, and halogens.

16. The process of claim 1, wherein the lens is an ophthalmic lens whose front side is coated with a multi-layer AR coating that has been applied with a vacuum deposition process.

* * * * *